US012325381B2

(12) United States Patent
Scott et al.

(10) Patent No.: US 12,325,381 B2
(45) Date of Patent: Jun. 10, 2025

(54) DETECTION DEVICE

(71) Applicant: Aptiv Technologies AG, Schaffhausen (CH)

(72) Inventors: John Douglas Scott, Commerce Township, MI (US); David B. Goss, Rochester Hills, MI (US); Stephen Loche, Rochester Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 664 days.

(21) Appl. No.: 17/193,902

(22) Filed: Mar. 5, 2021

(65) Prior Publication Data
US 2021/0284098 A1 Sep. 16, 2021

Related U.S. Application Data

(60) Provisional application No. 62/988,039, filed on Mar. 11, 2020.

(51) Int. Cl.
*B60R 25/24* (2013.01)
*G01S 5/06* (2006.01)
(Continued)

(52) U.S. Cl.
CPC ............... *B60R 25/24* (2013.01); *G01S 5/06* (2013.01); *G01S 13/08* (2013.01); *G01S 13/88* (2013.01); *B60R 2325/101* (2013.01)

(58) Field of Classification Search
CPC ..... B60R 25/24; B60R 2325/101; G01S 5/06; G01S 13/08; G01S 13/88
See application file for complete search history.

(56) References Cited

U.S. PATENT DOCUMENTS 5,268,795 A 12/1993 Usami
7,231,177 B2 6/2007 Walker et al.
(Continued)

FOREIGN PATENT DOCUMENTS

CN 103684533 3/2014
CN 206107099 U 4/2017
(Continued)

OTHER PUBLICATIONS

"Extended European Search Report", European Application No. 20157054.6, Aug. 28, 2020, 8 pages.
(Continued)

*Primary Examiner* — Vladimir Magloire
*Assistant Examiner* — Noah Yi Min Zhu
(74) *Attorney, Agent, or Firm* — Harness, Dickey & Pierce, P.L.C.

(57) ABSTRACT

The techniques of this disclosure relate to a detection device. The device includes a housing attached to an exterior portion of a vehicle and a printed circuit board. The device also includes a first sensor mounted to the printed circuit board and configured to detect first objects. The device also includes a second sensor mounted to the printed circuit board and configured to detect second objects different from the first objects. The second sensor detects the second objects based on radio frequency (RF) signals emitted by the second objects. The second objects are co-located with the first objects, and the second sensor detects the second objects when the first objects are undetected by the first sensor. The device improves a coverage of a radiation pattern of the antennas around a vehicle and reduces ADAS sensor system packaging costs.

33 Claims, 8 Drawing Sheets

(51) Int. Cl.
*G01S 13/08* (2006.01)
*G01S 13/88* (2006.01)

(56) References Cited

U.S. PATENT DOCUMENTS

| | | | |
|---|---|---|---|
| 7,772,966 B2 | 8/2010 | Turnbull et al. | |
| 8,576,138 B2 | 11/2013 | Suzuki et al. | |
| 8,614,645 B2 | 12/2013 | Chakam et al. | |
| 9,201,627 B2 | 12/2015 | Tam et al. | |
| 9,875,591 B2 | 1/2018 | Watters et al. | |
| 10,085,072 B2 | 9/2018 | Shimy et al. | |
| 10,149,133 B2 | 12/2018 | Seagnol et al. | |
| 10,369,966 B1* | 8/2019 | Higgins | G07C 9/00571 |
| 10,564,261 B2 | 2/2020 | Huebner et al. | |
| 10,793,109 B2 | 10/2020 | Salah et al. | |
| 10,839,627 B2 | 11/2020 | Golsch et al. | |
| 11,146,934 B2 | 10/2021 | Ruppel et al. | |
| 2002/0003481 A1 | 1/2002 | Kantola et al. | |
| 2003/0142004 A1* | 7/2003 | Gottwald | G01S 13/767 342/51 |
| 2005/0258936 A1 | 11/2005 | Ghabra et al. | |
| 2006/0022881 A1 | 2/2006 | Yegin et al. | |
| 2006/0097906 A1 | 5/2006 | Heide | |
| 2009/0251357 A1 | 10/2009 | Margomenos | |
| 2010/0317289 A1 | 12/2010 | Desai et al. | |
| 2011/0156946 A1 | 6/2011 | Margomenos | |
| 2011/0163904 A1 | 7/2011 | Alland et al. | |
| 2011/0210866 A1* | 9/2011 | David | G08G 1/166 340/901 |
| 2014/0240091 A1 | 8/2014 | Talty et al. | |
| 2014/0330449 A1* | 11/2014 | Oman | B60R 25/245 701/2 |
| 2014/0357194 A1 | 12/2014 | Jin et al. | |
| 2015/0048927 A1 | 2/2015 | Simmons | |
| 2015/0116085 A1* | 4/2015 | Juzswik | G08B 21/22 340/5.72 |
| 2015/0134949 A1 | 5/2015 | Baldwin | |
| 2016/0050219 A1 | 2/2016 | Niewczas et al. | |
| 2016/0050564 A1 | 2/2016 | Niewczas et al. | |
| 2017/0057497 A1 | 3/2017 | Laur et al. | |
| 2017/0093727 A1 | 3/2017 | Chen et al. | |
| 2017/0111763 A1 | 4/2017 | Morgan et al. | |
| 2017/0119318 A1* | 5/2017 | Shay | A61B 5/7225 |
| 2017/0134022 A1* | 5/2017 | Kim | H03K 17/955 |
| 2018/0009378 A1 | 1/2018 | Myers et al. | |
| 2018/0079359 A1 | 3/2018 | Park et al. | |
| 2019/0069243 A1 | 2/2019 | Bean et al. | |
| 2019/0193680 A1* | 6/2019 | Ette | G08B 25/08 |
| 2019/0213884 A1* | 7/2019 | Kim | G01S 17/931 |
| 2019/0248331 A1* | 8/2019 | Salah | G01S 5/0284 |
| 2019/0297628 A1 | 9/2019 | Kato et al. | |
| 2020/0192362 A1* | 6/2020 | Murad | G06V 20/586 |
| 2020/0310407 A1* | 10/2020 | Van Wiemeersch | B62D 15/0285 |
| 2020/0314619 A1 | 10/2020 | Ruppel et al. | |
| 2020/0334357 A1* | 10/2020 | Patne | G06F 21/56 |
| 2020/0408009 A1* | 12/2020 | Bussis | E05B 81/78 |
| 2021/0021295 A1* | 1/2021 | Yun | H04B 1/401 |

FOREIGN PATENT DOCUMENTS

| | | |
|---|---|---|
| DE | 102012008914 | 11/2013 |
| DE | 102014220713 | 4/2016 |
| JP | H07117725 A | 5/1995 |
| WO | 2018183036 | 10/2018 |

OTHER PUBLICATIONS

"Non-Final Office Action", U.S. Appl. No. 16/370,064, filed Dec. 30, 2020, 6 pages.

"Foreign Office Action", CN Application No. 202110265488.0, Dec. 2, 2022, 15 pages.

"Foreign Office Action", CN Application No. 202010229904.7, Nov. 25, 2021, 16 pages.

"Foreign Office Action", CN Application No. 202110265488.0, Apr. 11, 2023, 11 pages.

"Extended European Search Report", EP Application No. 21161609. 9, Jul. 16, 2021, 11 pages.

"Notice of Allowance", U.S. Appl. No. 16/370,064, filed Jun. 9, 2021, 8 pages.

Communication Pursuant to Article 94(3) EPC regarding European Patent Application No. 21161609.9, dated Oct. 1, 2024.

* cited by examiner

DETECTION DEVICE

CROSS-REFERENCE TO RELATED APPLICATIONS

This application claims the benefit under 35 U.S.C. 119 (e) of U.S. Provisional Application No. 62/988,039 filed Mar. 11, 2020, the disclosure of which is hereby incorporated by reference in its entirety herein.

BACKGROUND

Antennas used for remote keyless-entry (RKE) and passive-entry passive-start (PEPS) vehicle systems are positioned on the vehicle for detecting an approaching user in possession of a paired key fob. These antennas benefit from vehicle locations that are not blocked by metals or other vehicle components that may obstruct radio frequency (RF) transmissions. Placing these antennas at corners of the vehicle behind plastic trim components, for example, behind a bumper facia, can compete for available packaging space with radar or other ranging sensors. Some RKE and PEPS systems are transitioning from wireless RF protocols to newer BLUETOOTH® Low Energy (BLE) and Ultra-Wide Band (UWB) technologies for improved distance-measuring capabilities. Systems using BLE and UWB present packaging challenges for antenna and/or communication node placements because the antennas cannot be concealed behind metal structures due to the relatively high RF transmission frequencies.

As vehicle manufacturers move toward Phone-as-a-Key or Digital Key systems to allow cell phones and/or mobile devices to function as the key fob, it may be desirable to utilize a BLUETOOTH® Low Energy (BLE) capability that may exist within a user's mobile device to interact with the vehicle's RKE or PEPS. When relay attacks are a concern, automobile manufacturers are also interested in utilizing ultra-wideband (UWB) communications to inhibit these attacks. The significantly higher frequencies of the UWB communications have difficulty penetrating metal structures, such as vehicle body panels, and require the antennas to be externally mounted to the vehicle. These external antennas can be located behind facias, external mirrors, and trim panels that are non-metallic. These external antenna mounting locations add significantly to the vehicle integration costs, as these UWB and/or BLE antennas must be sealed from the environment and have electrical connectivity to the vehicle via wiring and connectors to these remote locations.

SUMMARY

This document describes one or more aspects of a detection device. In one example, a device includes a housing attached to, or that forms part of, an exterior portion of a vehicle. The device also includes a printed circuit board and a first sensor mounted to the printed circuit board and configured to detect first objects. The device also includes a second sensor mounted to the printed circuit board. The second sensor is configured to detect second objects different from the first objects based on radio frequency (RF) signals emitted by the second objects. The second objects are co-located with the first objects, and the second sensor is configured to detect the second objects when the first objects are undetected by the first sensor.

In another example, a method includes detecting, with a first sensor mounted to a printed circuit board retained within a housing attached to, or that forms part of, an exterior portion of a vehicle, first objects. The method also includes detecting, with a second sensor mounted to the printed circuit board, second objects different from the first objects based on radio frequency (RF) signals emitted by the second objects. The method also includes detecting, with the second sensor, the second objects when the first objects are undetected by the first sensor, wherein the second objects are co-located with the first objects.

This Summary is provided to introduce aspects of a detection device, which is further described below in the Detailed Description and Drawings. For ease of description, the disclosure focuses on vehicle-based or automotive-based systems, such as those that are integrated on vehicles traveling on a roadway. However, the techniques and systems described herein are not limited to vehicle or automotive contexts but also apply to other environments where sensors can be used to detect objects. This summary is not intended to identify essential features of the claimed subject matter, nor is it intended for use in determining the scope of the claimed subject matter.

BRIEF DESCRIPTION OF THE DRAWINGS

The details of one or more aspects of a detection device are described in this document with reference to the following drawings. The same numbers are used throughout the drawings to reference like features and components.

DETAILED DESCRIPTION

Overview

The techniques, systems, and apparatuses of this disclosure relate to a detection device. Distributing multiple remote keyless-entry (RKE) or passive-entry passive-start (PEPS) communication nodes and antennas about a vehicle can be beneficial for detecting a user's key fob from all directions, as increased antenna pattern coverage can be realized. For example, a location and distance of the key fob in possession of the user that is approaching the vehicle from an angle can be more readily determined when multiple antennas detect the key-fob signals. Placement of the antennas at door-entry points, corners, and front and rear sides of the vehicle may be particularly desirable for determining a direction and distance of the key fob or other mobile transceiver that may or may not be paired with the RKE or PEPS systems. Packaging the antennas and communication nodes with existing sensors, for example, ranging sensors, cameras, and satellite or cellular antennas, can improve detection of the key fob and reduce packaging costs of the entire vehicle active-safety sensor system.

This disclosure introduces a detection device. Described is an RKE and PEPS system that packages communication nodes with other active-safety sensors that improve a coverage of a radiation pattern of the antennas and reduces sensor system packaging costs.

Example Device

Figure 1:
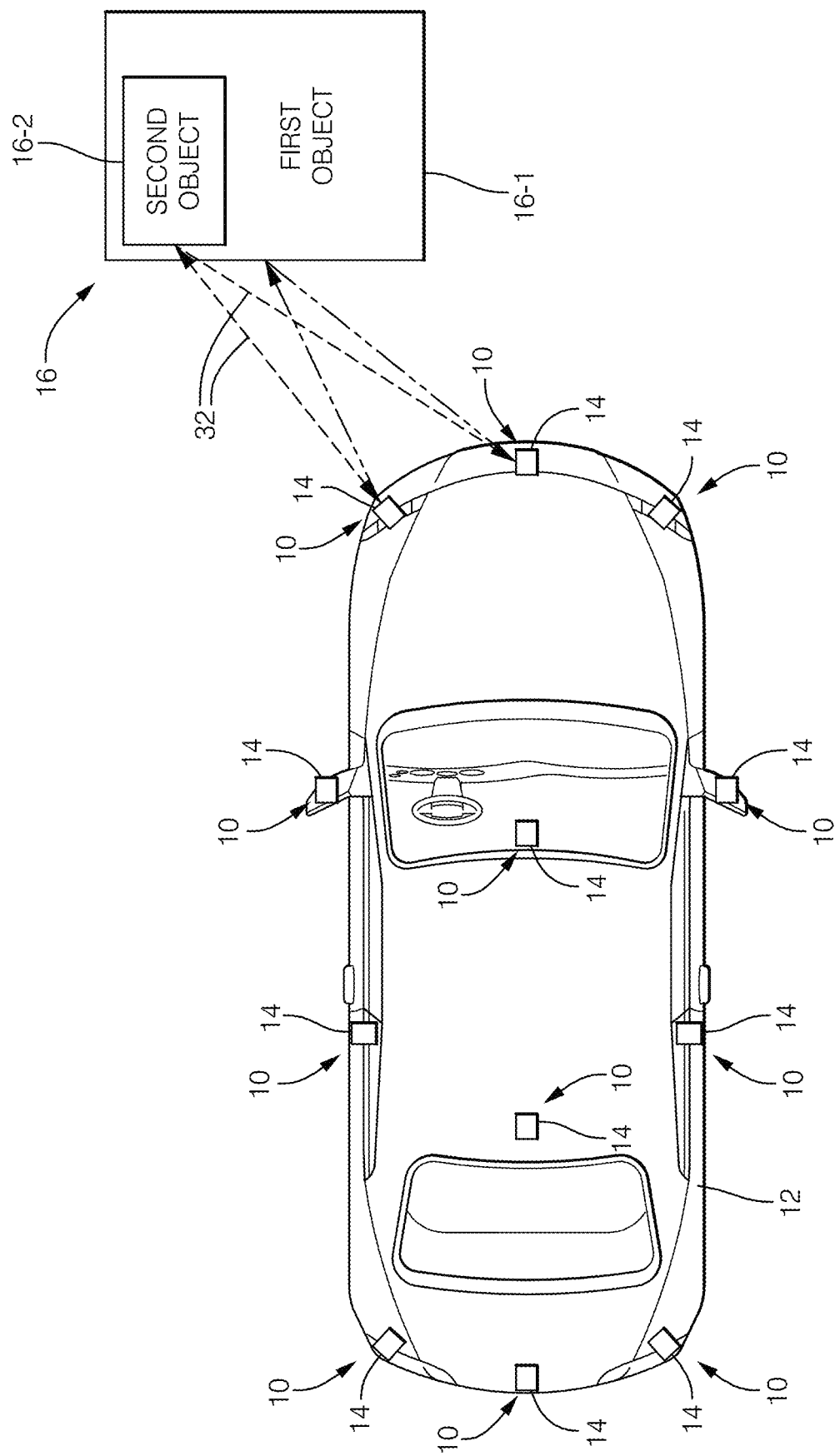
FIG. 1 illustrates an example detection device installed on a vehicle, in accordance with techniques of this disclosure.

FIG. 1 illustrates an example of a detection device 10, hereafter the device 10, installed on a vehicle 12. The device 10 includes a housing 14 attached to, or that forms part of, an exterior portion of the vehicle 12, and the vehicle 12 can include additional devices 10 distributed around the exterior of the vehicle 12. The housing 14 can be formed of a material that is transparent to electromagnetic radiation so that sensors within the housing 14 can transmit and receive signals to detect objects 16 proximate to the vehicle 12. For example, the housing 14 can be formed of a polymeric material or a glass that permits the signals to pass through the housing 14 with little to no signal attenuation. In the example illustrated in FIG. 1, a second object 16-2 is co-located with a first object 16-1, which will be explained in more detail below. It will be appreciated that the device 10 can also detect the objects 16 when the objects 16 are separated from one another.

Figure 2:
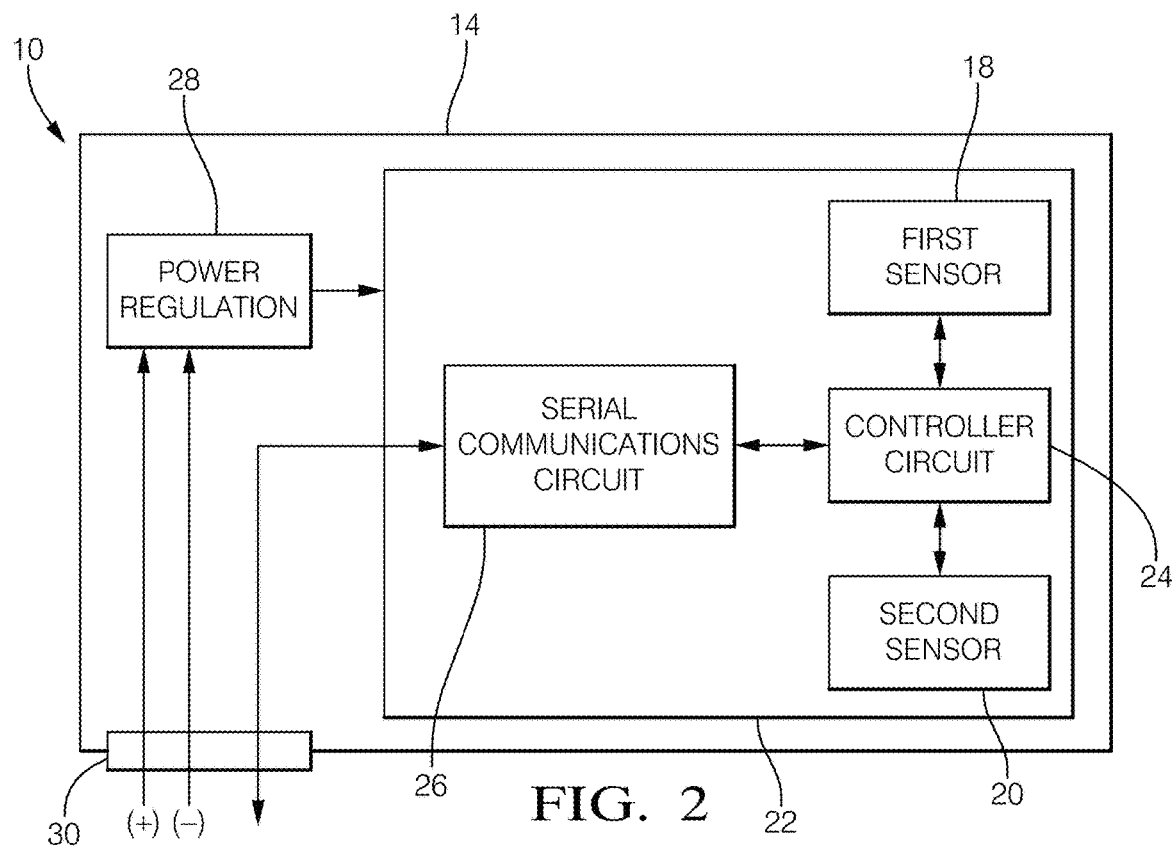
FIG. 2 illustrates an example of the example detection device separated from the vehicle of FIG. 1.

FIG. 2 illustrates the example device 10 separated from the vehicle 12. The device 10 includes a first sensor 18 and a second sensor 20 mounted to a same printed circuit board 22 (PCB 22) retained within the housing 14. The first sensor 18 and second sensor 20 can be attached to a same surface of the PCB 22 or can be attached to opposing surfaces of the PCB 22. The PCB 22 can be a single layer or multiple layer PCB 22 and can be formed of copper clad laminates that can have one or both surfaces covered with a copper foil electrical conductor. The copper foil can be etched or machined to create conductor traces to provide power and communications to the first sensor 18 and the second sensor 20 and to other electrical components attached to the PCB 22. The PCB 22 can also be screen printed with conductive traces, including via holes, to provide connections to the first sensor 18 and the second sensor 20 or other associated circuitry that may be on different layers of the PCB 22. The first sensor 18 and the second sensor 20 and other associated circuitry can be connected to the conductive traces on the PCB 22 via solder or wire bonds.

Example Architectures

The PCB 22 can include a same controller circuit 24 or separate controller circuits 24 configured to control the first sensor 18 and the second sensor 20, and in the example illustrated in FIG. 2, the first sensor 18 and the second sensor 20 are controlled by the same controller circuit 24. Controlling the first sensor 18 and the second sensor 20 with the same controller circuit 24 can be advantageous for reducing the area of the PCB 22 where packaging constraints may limit a size of the housing 14.

Referring again to FIG. 2, the PCB 22 can include a same serial communications circuit 26 configured to transmit data between the vehicle 12 or other control modules and the first sensor 18 and the second sensor 20. In the example illustrated in FIG. 2, the PCB 22 includes a single serial communications circuit 26 that serves both the first sensor 18 and the second sensor 20. The serial communications circuit 26 can transmit data to other vehicle controllers, for example, a gateway controller that manages the overall advanced driver-assistance system (ADAS). The serial communications circuit can be a controller area network (CAN) channel or can be a local interconnect network (LIN) channel. In other examples, the serial communications circuit can be an ethernet channel. In yet other examples, the serial communications circuit can be a wireless channel, for example, using BLUETOOTH® and WI-FI® technologies.

Figure 3:
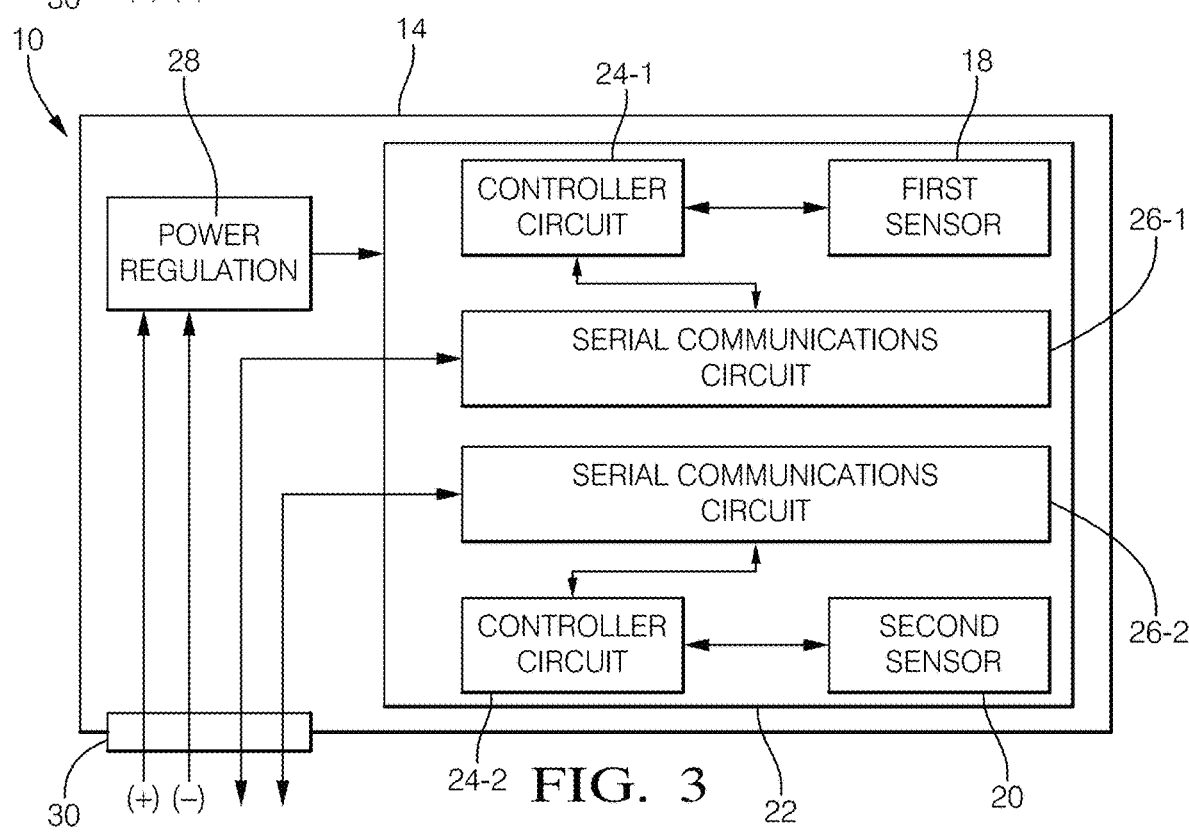
FIG. 3 illustrates another example of the example detection device separated from the vehicle of FIG. 1.

FIG. 3 illustrates an example where the first sensor 18 and the second sensor 20 are controlled with separate controller circuits 24-1 and 24-2. This example can be advantageous for utilizing off-the-shelf controller circuits 24 that are dedicated to performing the separate sensing tasks of the first sensor 18 and the second sensor 20, or for distributing heat across larger or different areas of the PCB 22. In addition, electrical power delivered to the individual controller circuits 24-1 and 24-2 can be regulated separately to enable a low-power operating condition for one of the controller circuits 24, for example, when the vehicle 12 is powered off and second sensor 20 is required to function in a sleep-mode where the second sensor 20 draws a low electrical current and can be awakened and operational in a short time period.

Referring again to the example illustrated in FIG. 3, the PCB 22 includes separate serial communications circuits 26-1 and 26-2 configured to transmit data between the vehicle 12 or other control modules and the first sensor 18 and the second sensor 20. The separate serial communications circuits 26-1 and 26-2 can transmit data in parallel to other vehicle controllers and may reduce a data-transmission time and message payload or enable porting the data via different communication buses.

The controller circuits 24 in FIGS. 2 and 3 may be implemented as a microprocessor or other control circuitry such as analog and/or digital control circuitry. The control circuitry may include one or more application-specific integrated circuits (ASICs), field-programmable gate arrays (FPGAs) that are programmed to perform the techniques, or one or more general-purpose hardware processors programmed to perform the techniques pursuant to program instructions in firmware, memory, other storage, or a combination. The controller circuit 24 may also combine custom hard-wired logic, ASICs, or FPGAs with custom programming to perform the techniques. The controller circuit 24 may include a memory or storage media (see FIG. 7), including non-volatile memory, such as electrically erasable programmable read-only memory (EEPROM) for storing one or more routines, thresholds, and captured data. The EEPROM stores data and allows individual bytes to be erased and reprogrammed by applying programming signals. The controller circuit 24 may include other examples of non-volatile memory, such as flash memory, read-only memory (ROM), programmable read-only memory (PROM), and erasable programmable read-only memory (EPROM). The controller circuit 24 may include volatile memory (e.g., dynamic random-access memory (DRAM), static random-access memory (SRAM)). The one or more routines may be executed by the processor to perform steps for transmitting or receiving radio frequency signals by the first sensor 18 and the second sensor 20 as described herein.

In the examples illustrated in FIGS. 2 and 3, the housing 14 includes a single power regulation device 28 that regulates power to the first sensor 18 and the second sensor 20. Utilizing the same power regulation device 28 for both sensors 18, 20 can reduce the size of the housing 14 and reduce the packaging volume or footprint. The first sensor 18 and the second sensor 20 may operate at different voltages (V), for example, 5V, 12V, 24V, or 48V, and may require power only when the vehicle is powered on. In other examples, second sensor 20 may require power when the vehicle is powered off, as mentioned previously, for diagnostic or recovery purposes. Separate power regulation devices 28 dedicated to the first sensor 18 and second sensor 20 can also be included in the housing 14 and may be advantageous for applying available off-the-shelf components or for controlling the distribution of heat within the housing 14.

FIGS. 2 and 3 illustrate examples where the housing 14 includes a single sealed electrical connector 30 configured to provide power and communication channels to the first sensor 18 and second sensor 20. The single sealed electrical connector 30 can reduce manufacturing costs of the device 10 by reducing a number of interconnection points. In addition, the single sealed electrical connector 30 can improve a durability of the device 10 by reducing the number of openings in the housing 14 that may enable contamination to enter the housing 14, for example, water or other fluids and dust that may be typical in the automotive environment. The single sealed electrical connector 30 may be formed integral to the housing 14 or may be formed separately and attached to the housing using polymeric seals or adhesives to inhibit contamination from entering the housing around the electrical connector 30. The single sealed electrical connector 30 may be formed of a polymeric material having dielectric properties that provide electrical isolation for electrical terminals retained by the electrical connector 30, for example, a nylon or glass-filled nylon.

First Sensor

Figure 4:
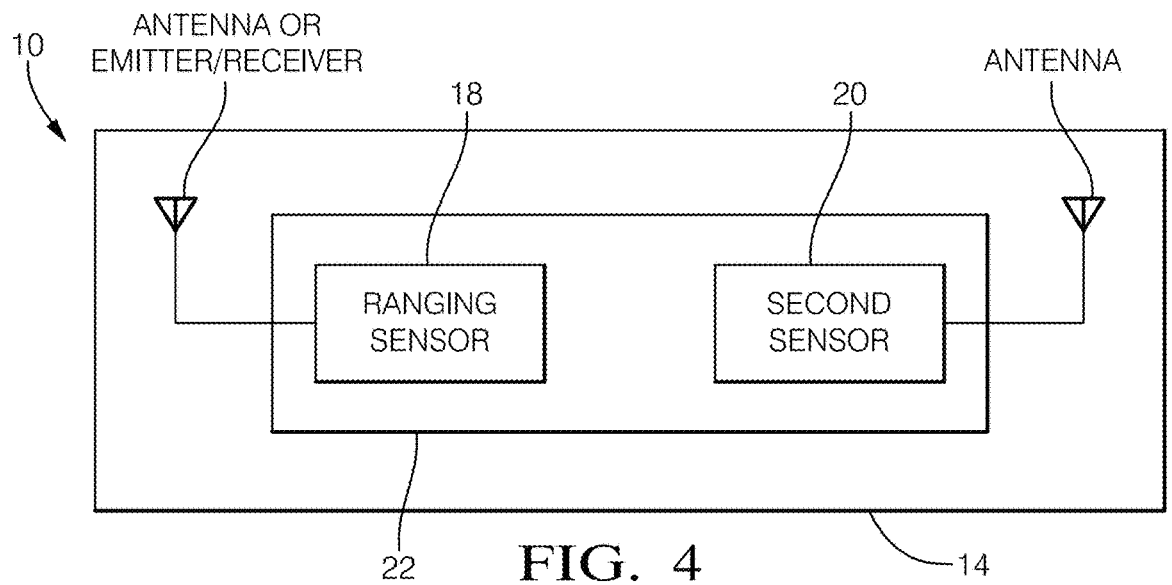
FIG. 4 illustrates an example of the example detection device with a first sensor comprising a ranging sensor.

FIG. 4 illustrates an example where the first sensor 18 includes a ranging sensor, for example, a radar sensor, a LiDAR sensor, or an ultrasonic sensor, that detects a distance between the first sensor 18 and the first objects 16-1. Automotive radar sensors use microwave signals in a frequency band that typically ranges from 76 gigahertz (76 GHz) to 81 GHz to detect objects 16 and can determine distances based on a time to send and receive a reflected signal or a travel time of the signal. The radar sensor can also detect movement of the object based on a change in a phase of the reflected signal known as the Doppler effect. LiDAR sensors operate in a similar manner to radar sensors but instead use laser light pulses to detect objects and distances based on the travel time of the laser pulse and the Doppler effect. Ultrasonic sensors use the travel time of sound waves to detect objects and distances. The ranging sensors can transmit and receive signals via antennas or optical emitters and receivers that are in communication with the control circuitry mounted to the PCB 22. The antennas or optical emitters and receivers can transmit and receive signals through a signal-transparent radome or housing cover that forms part of the exterior of the housing 14 that may be mounted flush with the exterior body panel or window of the vehicle 12. The ranging sensors can detect the first objects 16-1 that include other vehicles, persons, animals, and stationary objects, for example, buildings or traffic signs.

Figure 5:
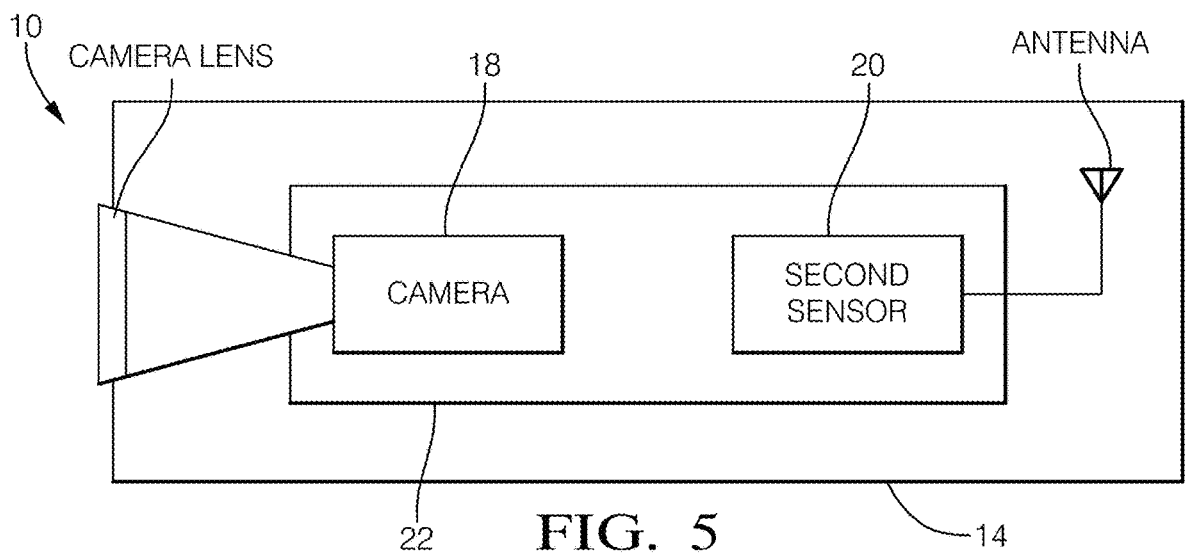
FIG. 5 illustrates another example of the example detection device with the first sensor comprising a camera.

FIG. 5 illustrates an example where the first sensor 18 includes a camera, for example, a video camera that can capture images of objects 16 in a field of view of the camera. A camera lens can be retained within the housing 14 with a view of the first objects 16-1 through a transparent cover or window of the housing 14 that may include the window of the vehicle 12. The camera lens can also be mounted remotely from the housing 14 to an exterior body panel or window of the vehicle 12. The camera may be any camera suitable for use in automotive applications, for example, ADAS applications and/or occupant detection applications. The camera includes optics that may include one or more fixed-focus lenses. The camera includes an image sensor comprised of a two-dimensional array of pixels organized into rows and columns that define a resolution of the camera. The pixels may be comprised of a Charge Coupled Device (CCD) and/or a Complementary Metal Oxide Semiconductor (CMOS) that convert light into electrical energy based on an intensity of the light incident on the pixels.

Figure 6:
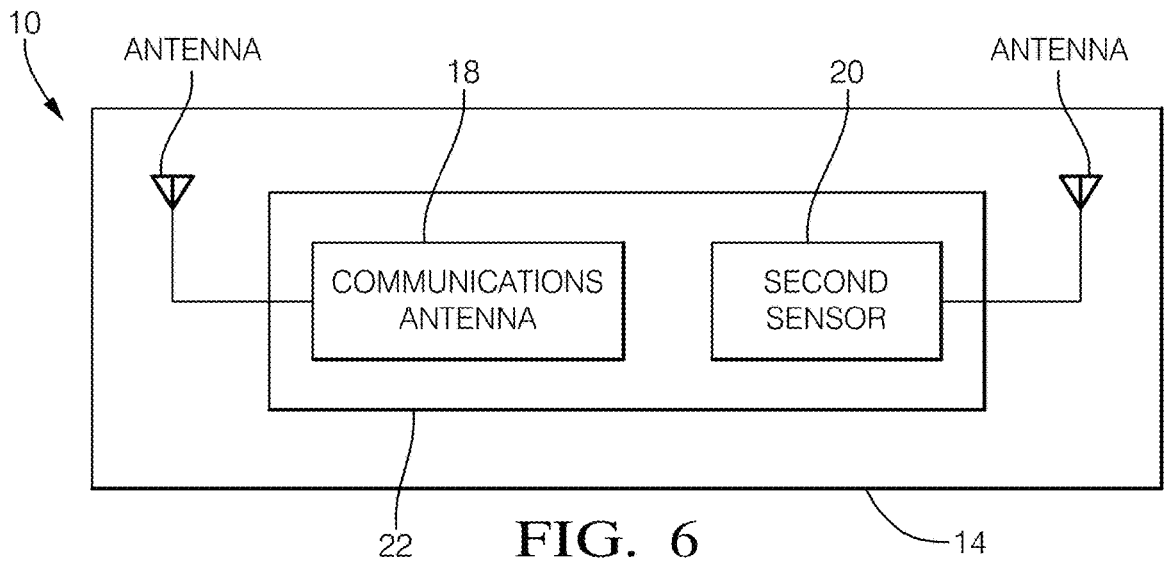
FIG. 6 illustrates yet another example of the example detection device with the first sensor comprising a communications antenna.

FIG. 6 illustrates an example where the first sensor 18 includes a communications antenna that transmits or receives communications from a cellular network, a satellite network, or a WI-FI® network. The communications antenna may be mounted to a roof of the vehicle 12, for example, inside a shark-fin antenna housing, or may be mounted flush to the window or exterior body panel of the vehicle 12 in the form of a conformal antenna. The communications antenna can interface with an infotainment system that may be installed on the vehicle 12 via a wiring harness that may be a component of an electrical system of the vehicle 12.

Second Sensor

Figure 7:
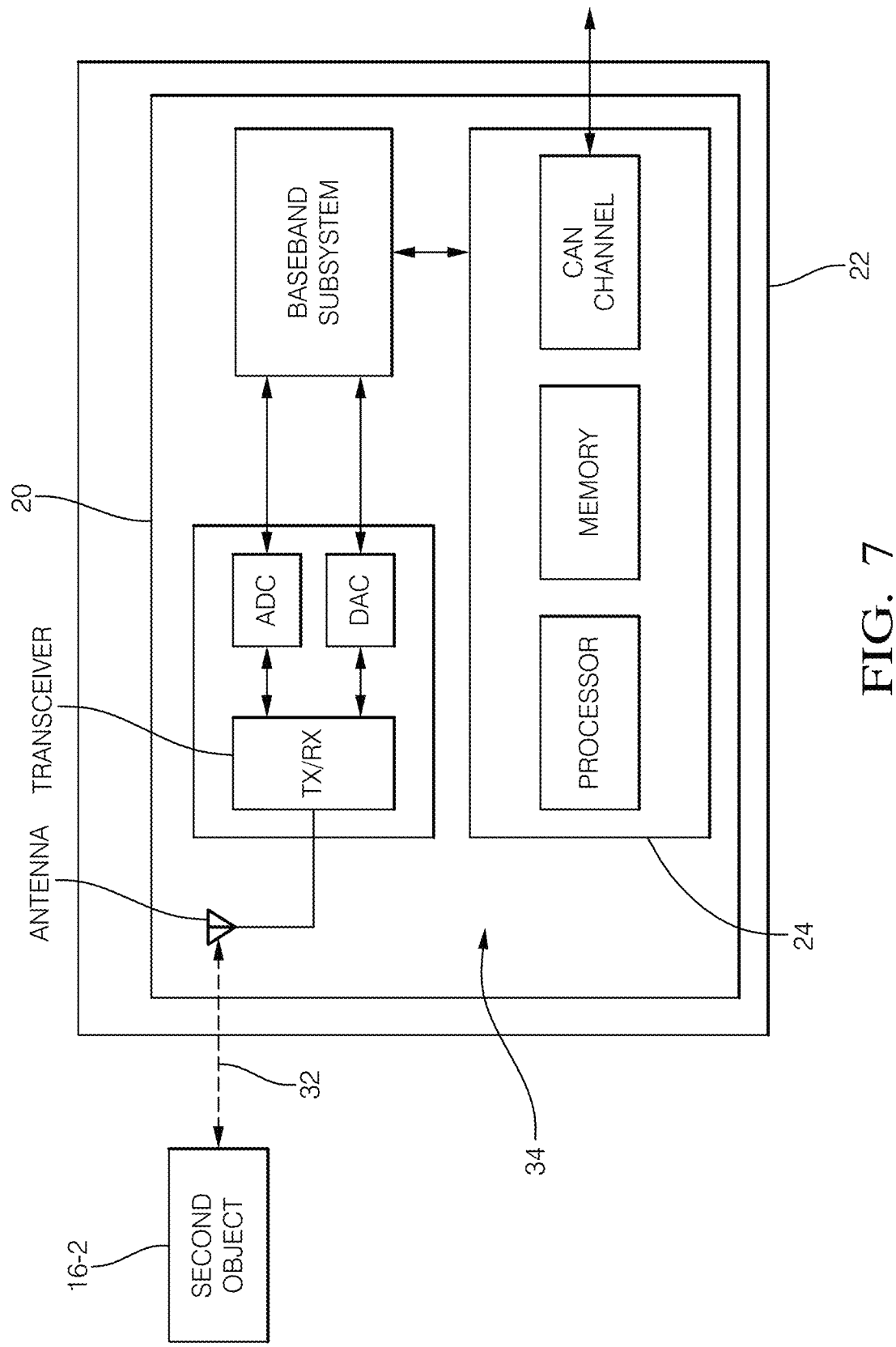
FIG. 7 illustrates an example of a second sensor of the example detection device of FIGS. 1-6.

FIG. 7 illustrates an example of the second sensor 20 mounted to the PCB 22. The second sensor 20 is configured to detect the second objects 16-2 that are different from the first objects 16-1 based on radio frequency (RF) signals 32 emitted by the second objects 16-2. The second objects 16-2 can include a mobile phone, a tablet, and a key fob. The RF signals 32 are wireless electromagnetic signals or radio waves having frequencies in a range from about 3 hertz (Hz) to 300 GHz. In some examples, RF signals 32 are generated from natural sources, for example, solar flares or lightning, and may be considered sources of electromagnetic noise. In other examples, the RF signals 32 may be generated for communication purposes, for example, in television and radio broadcasting, radar systems, global navigation satellite systems (GNSS), mobile computing devices, remote controller devices, tracking devices, and cellular telephone networks. To reduce interference within the radio frequency spectrum, similar services operate in similar frequency bands or contiguous frequency sections. For example, Global Positioning System (GPS) is a GNSS that operates in two frequency bands of 1.2 GHZ and 1.5 GHZ. BLUETOOTH® and WI-FI® are two prominent wireless standards having RF signals 32 that operate in a frequency band of 2.4 GHz yet utilize different sections of the frequency band to reduce interference. For example, the BLUETOOTH® protocol divides the frequency band into 80 channels, each 1 megahertz (MHz) wide, and changes channels up to 1600 times per second. The BLUETOOTH® Low Energy protocol divides the frequency band into 40 channels, each 2 MHz wide. Some BLUETOOTH® versions include Adaptive Frequency Hopping, which attempts to detect existing signals, for example, WI-FI® channels, and avoid them by negotiating a channel map between the communicating BLUETOOTH® devices. Ultra-Wide Band (UWB) is a wireless protocol that operates in the 3 GHz to 10.6 GHz range and pulses the transmissions of RF signals 32 about every two nanoseconds. The UWB transmissions do not interfere with conventional narrowband and carrier wave transmissions in the same frequency band. RF signals 32 using a same protocol or standard, for example, the BLUETOOTH® standard, may differ based on their application or purpose. In some examples, BLUETOOTH® RF signals 32 may include information unique to the RKE system. In other examples, BLUETOOTH® RF signals 32 may be communications between other vehicle systems that are different from the RKE system.

Referring back to FIG. 7, the RF signals 32 from the second objects 16-2 can comprise one of key fob identification communications and key fob localization communications (hereafter referred to as key fob communications) originating from one of the RKE system, the PEPS system, and the Digital Key system. The second sensor 20 may be capable of transmitting both digital-wave and continuous-wave (i.e., analog) electromagnetic signals. In some examples, the second sensor 20 may be programmed to transmit a localization protocol, for example, a digital message, including a preamble, a universal wake-up identification, and a data field that designates the message as an RKE, PEPS, or Digital Key system broadcast. In some examples, the digital message may be followed by a continuous-wave broadcast wherein a portion of the broadcast represents Received Signal Strength Indicator values (RSSI values) of the RF signals 32 detected by the key fob or mobile transceiver. The RSSI values are a measurement of the power present in the received RF signal. Larger RSSI values indicate stronger received RF signals 32 and are inversely related to a distance between the signal source, for example, between the broadcasting antenna and the key fob. That is, the stronger the detected radio signal, the shorter the distance between the broadcasting antenna and the key fob.

In some examples, the second sensor 20 is configured to transmit the key fob communications that are relatively low-frequency electromagnetic signals in a frequency band of about 125 kilohertz (kHz), for example, 100 kHz-150 kHz. In some examples, the second sensor 20 is configured to transmit electromagnetic signals in a frequency band of about 315 MHz, for example, 260 MHz-470 MHz. Transmission of these relatively low-frequency electromagnetic signals may be advantageous because the low-frequency electromagnetic signals in the above-mentioned low-frequency band are able to pass through a human body with little to no distortion or attenuation.

In some examples, the second sensor 20 is configured to transmit the key fob communications that are relatively high-frequency electromagnetic signals in accordance, or that comply with, a BLUETOOTH® Core Specification version 4.2 and later, including BLUETOOTH® Low Energy (hereafter BLE). The BLE RF signals 32 are transmitted in a 2.4 GHz frequency band, for example, 2.400 GHz-2.4835 GHz, and have a maximum theoretical unobstructed range exceeding 600 meters (600 m). In some examples, BLE is employed in mobile phones, gaming systems, headsets, automotive infotainment systems, and personal computers. BLE devices may be detected through a procedure based on broadcasting advertising packets from a host device (e.g., the second sensor 20) and receiving scan-request packets from a remote BLE device, for example, the key fob or mobile transceiver (e.g., a smartphone or tablet). This may be done using at least three separate frequencies within the frequency band to reduce interference. The BLE advertising device sends a packet of information on at least one of the at least three frequencies, with a repetition period called an advertising interval. A BLE scanner in the host device listens to the frequency for a duration called a scan window when the scan request packets are received, which is periodically repeated every scan interval. BLE devices may be paired by sharing a code unique to each BLE device, called a link key. The link keys are exchanged between the pairing devices and stored in the pairing devices to establish a secure connection, also referred to as a bond. The unconnected or unpaired devices may share a limited amount of information without pairing, such as a device name, a device class, a list of services provided by the device, and other technical information specific to the device (e.g., device services, manufacturer, BLE specification, and clock offset). The second sensor 20 may be further configured to output the key fob communications at a first transmission level corresponding to a first transmission range. In some examples, the first transmission level is a full-power level, for example, 0.5 mW to 10 mW, that corresponds to the maximum range of transmission that may exceed 600 m.

In other examples, the second sensor 20 is configured to transmit high-frequency key fob communications in accordance with, or that comply with, an Ultra-wideband (UWB) technology. UWB technology transmits information spread over a large signal bandwidth greater than 500 MHz at varying pulse repetition rates. An aspect of UWB technology is the ability of a UWB radio system to more-accurately determine the "time of flight" of the transmission at various frequencies to determine localization measurements. The broad range of UWB RF frequencies (e.g., frequency bands in the 3 GHz to 10.6 GHz range) is also helpful to provide signal-propagation paths that include paths relatively free of multipath distortions.

Referring back to FIG. 7, the second sensor 20 comprises a communication node 34 that includes one or more of a transceiver, an antenna, and a communication network channel. In the example illustrated in FIG. 7, the communication channel is the controller area network (CAN) channel. The second sensor 20 is configured to emit and receive the RF signals 32 via the antennas of the communication nodes 34, as will be described in more detail below.

The communication node 34 illustrated in FIG. 7 may be any communication node 34 suitable for automotive applications. In the example illustrated in FIG. 7, the communication node 34 includes an RF subsystem including the transceiver, an analog to digital converter (ADC), and a digital to analog converter (DAC). The ADC is configured to convert the analog RF signals 32 received via the antenna to digital signals for processing by a baseband subsystem, and the DAC is configured to convert digital signals received from the baseband subsystem to analog RF signals 32 for broadcasting via the antenna. The communication node 34 may include a processor and memory, as well as the communication network channel (e.g., the CAN channel) to communicate with other vehicle systems.

Object Detection

Figure 8:
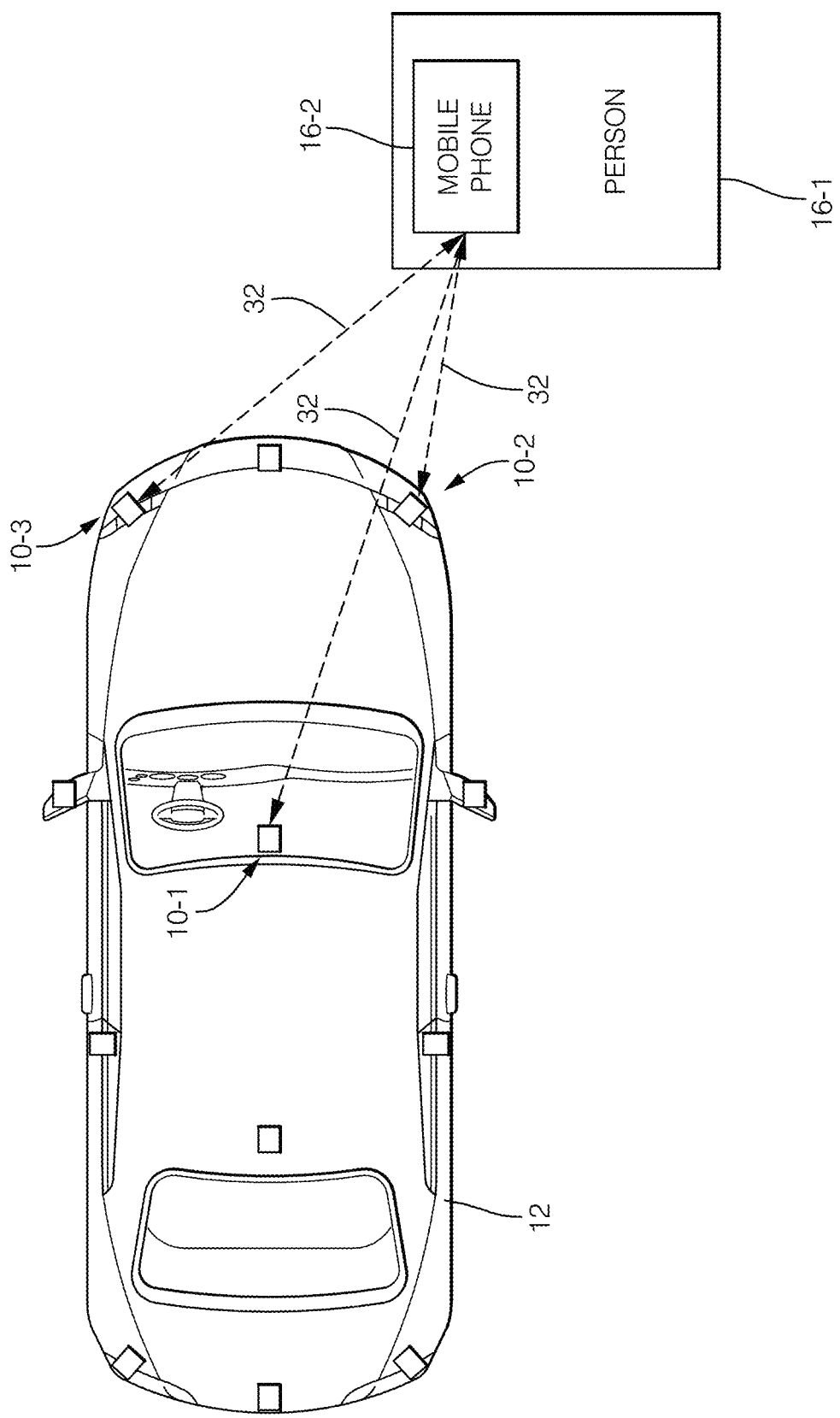
FIG. 8 illustrates an example of the second sensor of the example detection device detecting the second object that is a mobile phone co-located with a person.

FIG. 8 illustrates an example where the second sensor 20 detects the second object 16-2 that is co-located with the first object 16-1, for example, the mobile phone that is carried by the person walking in front of the vehicle 12. In this example, the vehicle is stationary and powered off, causing the first sensors 18 to be inactive, and the mobile phone includes the Digital Key system that is paired with the RKE or PEPS systems enabling the user to access the vehicle 12. In this example, the device 10-1 is located behind a windshield of the vehicle 12 and includes the first sensor 18 that is a forward-facing camera, and devices 10-2 and 10-3 are located at right and left front corners of the vehicle 12 and include the first sensors 18 that are radar sensors. With the radar sensors inactivated, the person walking in front of the vehicle 12 remains undetected by the first sensors 18. The second sensors 20 in the devices 10-1 to 10-3 can detect the mobile phone, as described above, via the RF signals 32 and can localize the mobile phone using the RSSI values or the time of flight values. This localization can be used to enable secure access to the vehicle 12 by the holder of the mobile phone according to the RKE or PEPS system protocols.

Referring back to FIG. 8, more-accurate and timely localizations, or determinations of positions or distances of the mobile phone relative to the vehicle 12, may be enabled when using triangulation techniques via the second sensors 20 in the devices 10-1 to 10-3. In this example, the second sensor 20 fixed inside the forward-facing camera of device 10-1 may have improved ranging accuracy when using BLE and/or UWB technologies due to the height of the forward-facing camera above the ground, relative to the other devices 10-2 and 10-3 installed on the vehicle 12. The forward-facing camera is typically installed higher above the ground compared to the other devices 10 that are typically installed behind the bumper facias or door panels. This increased height results in the distance-measurement signals being dominated by line-of-sight paths, as opposed to reflected signal paths where the signal bounces off the ground and is measured as an increased distance, as illustrated in FIG. 9.

Figure 9:
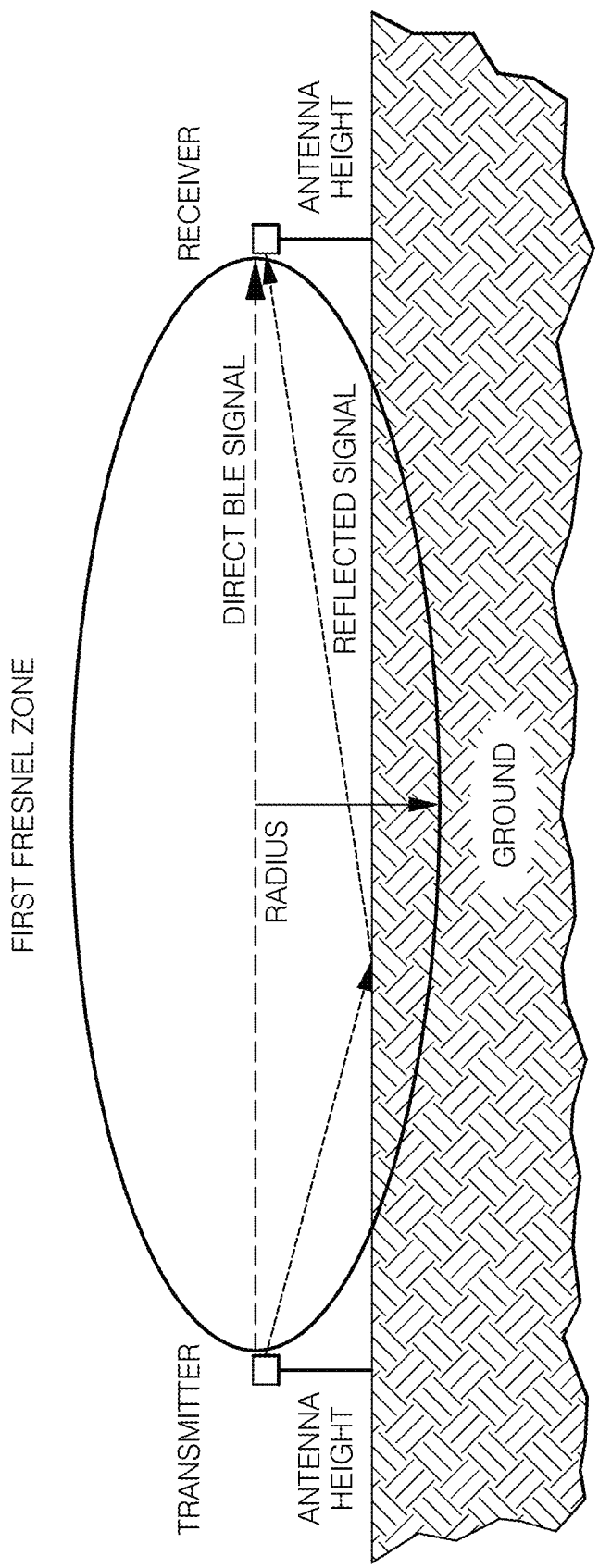
FIG. 9 illustrates an example of a first Fresnel zone of the example detection device.

FIG. 9 illustrates an example of a primary or first Fresnel zone, which defines the area around a visual line-of-sight into which the RF signals 32 diffuse or spread. To ensure the highest performance of a wireless link, the first Fresnel zone is recommended to be at least 80% clear of obstructions, which includes the ground. In an example, a radius of the largest area of the first Fresnel zone may be determined based on the distance between the antennas and the transmission frequency using the equation, $$r = 17.32 \times \sqrt{d/4f}$$

where r is the radius, d is the distance between antennas in kilometers, and f is the transmission frequency in GHz. In an example, for a mobile phone located 10 m from the vehicle and a BLE signal transmission of 2.4 GHz, the radius of the first Fresnel zone is approximately 1.1 m. Furthermore, increasing the distances between the two antennas in FIG. 9 can also increase the radius of the first Fresnel zone, enveloping more potential obstructions. As such, mounting the second sensor 20 higher on the vehicle 12, such as in the forward-facing camera location, reduces multipath reflected signals, as well as the amount of obstructed signal caused by the ground.

Figure 10:
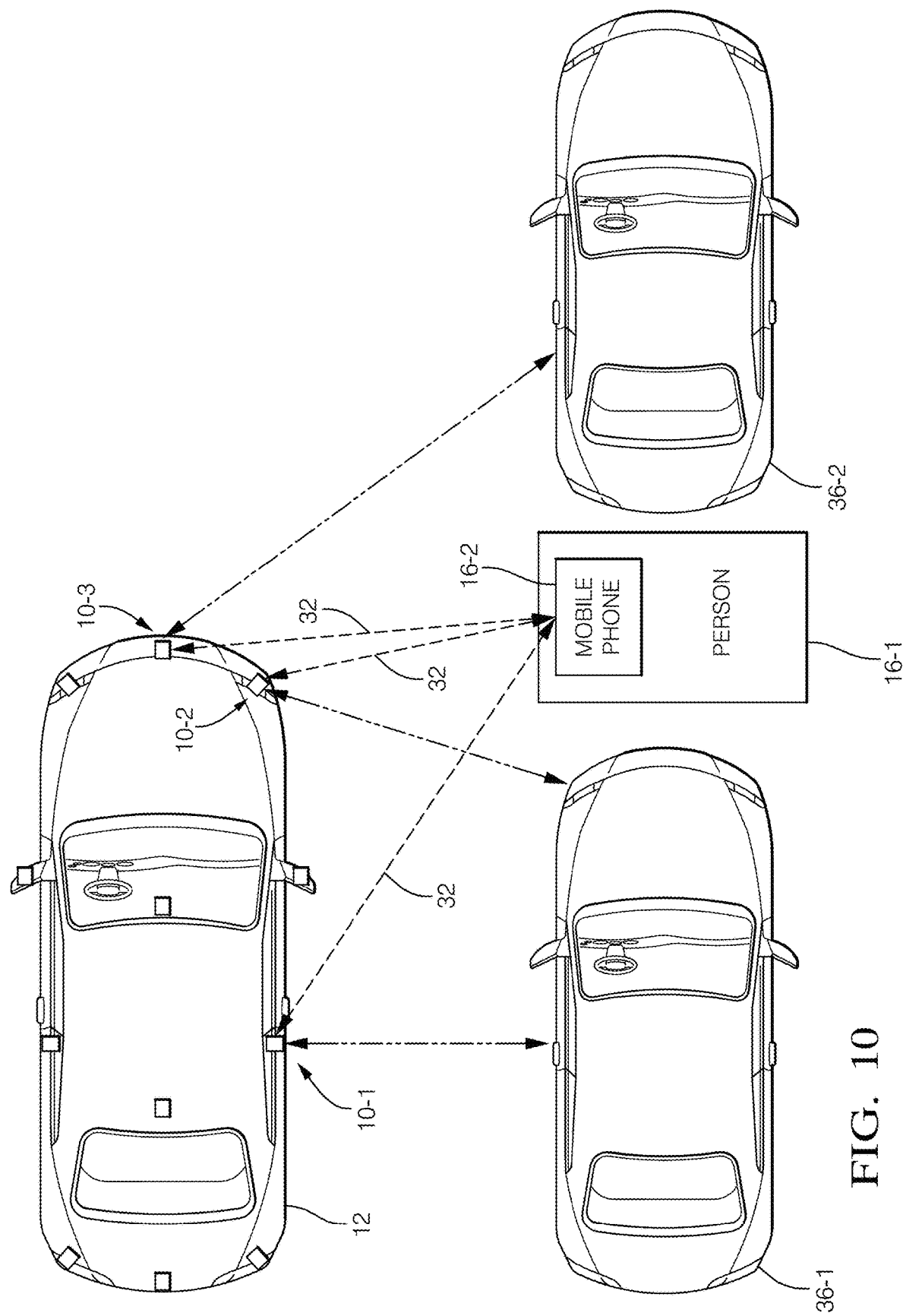
FIG. 10 illustrates another example of the second sensor of the example detection device detecting the second object that is the mobile phone co-located with the person.

FIG. 10 illustrates another example where the second sensor 20 detects the mobile phone that is carried by the person. In this example, the vehicle 12 is traveling on a roadway, and the person is located between two parked vehicles 36-1 and 36-2 on a right side of the road. The mobile phone includes the Digital Key system that is not paired or synchronized with the RKE or PEPS systems on the vehicle 12. In this example, the device 10-1 is located in a right door panel of the vehicle 12 and includes the first sensor 18 that is a side-facing camera. Devices 10-2 and 10-3 are located at the right corner and center of the bumper of the vehicle 12 and include the first sensors 18 that are radar sensors. Due to the proximity of the person to the parked vehicles, the person may be blocked or obscured from a field of view of the radar sensors and the side-facing camera, resulting in the person being undetected by the first sensors 18. Additionally, where the person is in close proximity to the parked vehicles 36-1 and 36-2, the radar sensors may not resolve the person's position separately from the parked vehicles 36-1 or 36-2. The second sensors 20 in the devices 10-1 to 10-3 can detect the mobile phone, as described above, via the RF signals 32 and can localize the mobile phone using the RSSI values or the time of flight values. This localization can be used by the ADAS system to determine whether the person holding the mobile phone presents a collision danger and can warn a driver of the vehicle 12 or activate emergency braking or steering maneuvers.

Example Method

Figure 11:
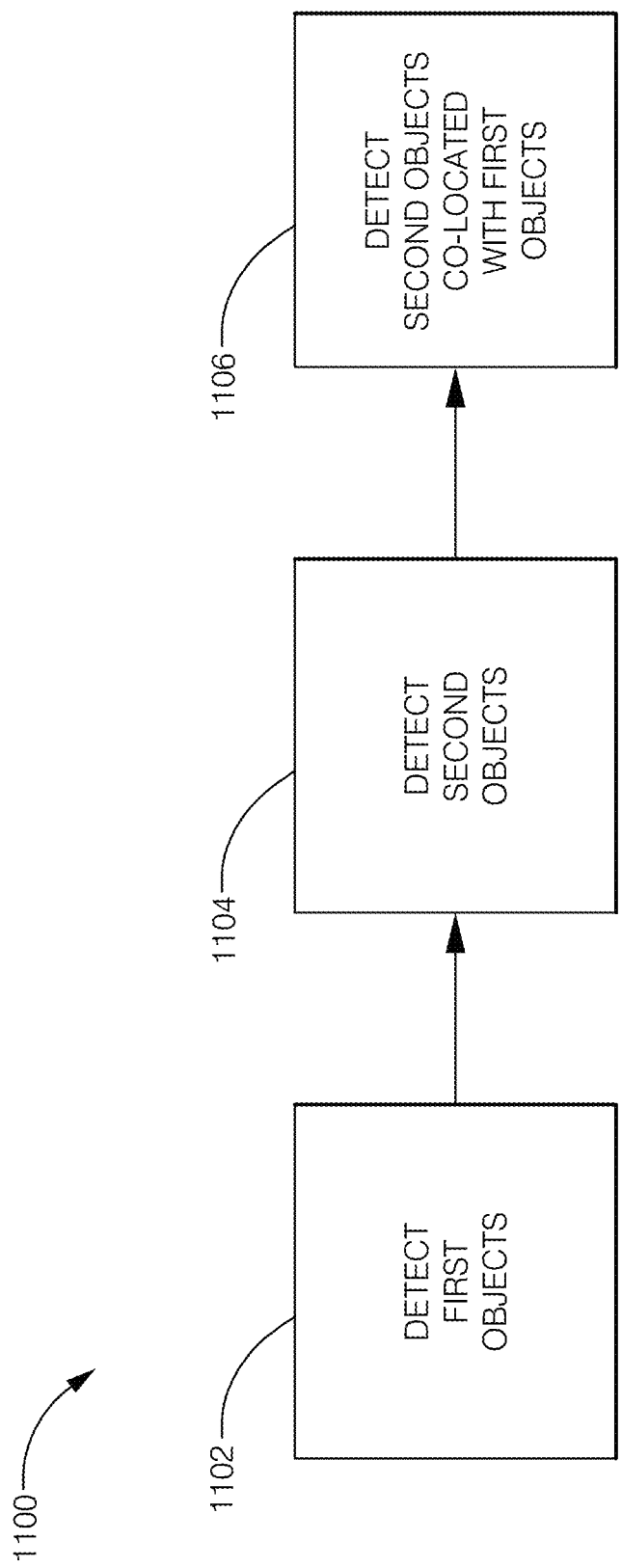
FIG. 11 illustrates an example method of detecting objects with the example detection device.

FIG. 11 illustrates example methods 1100 performed by the device 10. For example, the controller circuit 24 configures the device 10 to perform operations 1102 through 1106 by executing instructions associated with the controller circuit 24. The operations (or steps) 1102 through 1106 are performed but not necessarily limited to the order or combinations in which the operations are shown herein. Further, any of one or more of the operations may be repeated, combined, or reorganized to provide other operations.

Step 1102 includes DETECT FIRST OBJECTS. This can include detecting, with the first sensor 18, the first objects 16-1 that include one of a person and another vehicle, as described above. The first sensor 18 is mounted to the PCB 22 retained within the housing 14 of the device 10 that is attached to, or that forms part of, the exterior portion of the vehicle 12. The device 10 includes the first sensor 18 and the second sensor 20 mounted to the same PCB 22, as described above. The first sensor 18 can include the radar sensor, the LiDAR sensor, or the ultrasonic sensor that detects the distance between the first sensor 18 and first objects 16-1, as described above. The first sensor 18 can include the video camera that captures images of the first objects 16-1 or can include the communications antenna that transmits or receives communications from the cellular network, the satellite network, or the WI-FI® network, as described above.

Step 1104 includes DETECT SECOND OBJECTS. This can include detecting, with the second sensor 20, the second objects 16-2 that are different from the first objects 16-1, as described above. The second sensor 20 detects the second objects 16-2 based on RF signals 32 emitted by the second objects 16-2 that include the mobile phone, the tablet, and the key fob. The second sensor 20 comprises the communication node 34 comprising the transceiver, the antenna, and the communication network channel, and the RF signals 32 comprise one of key fob identification communications and key fob localization communications. The second sensor 20 can transmit the key fob communications that are relatively high-frequency electromagnetic signals in accordance with BLE protocols or can transmit high-frequency key fob communications in accordance with the UWB technology, as described above. The second sensors 20 can localize the second object 16-2 based on the RSSI values that are a measurement of the power present in the received RF signal, or based on the time of flight measurements, as described above.

Step 1106 includes DETECT SECOND OBJECTS CO-LOCATED WITH FIRST OBJECTS. This can include detecting, with the second sensor 20, the mobile phone when the person holding the mobile phone is undetected by the first sensor 18, as described above. The second sensor 20 can detect the mobile phone when the vehicle 12 is powered off and the ranging sensors or cameras are inactive and not operable to detect the person or other objects. The second sensor 20 can also detect the mobile phone when the person holding the mobile phone is obscured from the field of view of the ranging sensor or camera, for example, when the view of the person holding the mobile phone is blocked by other vehicles or other objects 16, as described above.

EXAMPLES

In the following section, examples are provided.

Example 1. A device comprising: a housing attached to, or that forms part of, an exterior portion of a vehicle; a printed circuit board; a first sensor mounted to the printed circuit board and configured to detect first objects; and a second sensor mounted to the printed circuit board and configured to detect second objects different from the first objects based on radio frequency (RF) signals emitted by the second objects, the second sensor being configured to detect the second objects when the second objects are co-located with the first objects, and the first objects are undetected by the first sensor.

Example 2. The system of the previous example, wherein the first sensor comprises a ranging sensor configured to detect a distance between the first sensor and the first objects.

Example 3. The system of any of the previous examples, wherein the ranging sensor is a radar sensor, and wherein the housing forms a corner section of the exterior portion of the vehicle.

Example 4. The system of any of the previous examples, wherein the first sensor comprises a camera configured to capture images of the first objects.

Example 5. The system of any of the previous examples, wherein the first sensor comprises a communications antenna configured to receive communications from one or more of a cellular network and a satellite network.

Example 6. The system of any of the previous examples, wherein the first objects include one of a person and another vehicle.

Example 7. The system of any of the previous examples, wherein the second objects include one of a mobile phone, a tablet, and a key fob.

Example 8. The system of any of the previous examples, wherein the second objects detected by the second sensor are obscured from a field of view of the first sensor.

Example 9. The system of any of the previous examples, wherein the second sensor comprises a communication node comprising one or more of a transceiver, an antenna, and a communication network channel.

Example 10. The system of any of the previous examples, wherein the RF signals comprise one of key fob identification communications and key fob localization communications.

Example 11. The system of any of the previous examples, wherein the second sensor is further configured to transmit RF signals originating from one of a remote keyless entry (RKE) system, a passive entry passive start (PEPS) system, and a Digital Key system.

Example 12. The system of any of the previous examples, wherein the second sensor is configured to transmit the RF signals in accordance with one of a BLUETOOTH® Core Specification version 4.2 and later, and an Ultra-wideband (UWB) technology.

Example 13. The system of any of the previous examples, wherein the housing includes one of a same power regulation device or separate power regulation devices configured to regulate power to the first sensor and the second sensor.

Example 14. The system of any of the previous examples, wherein the printed circuit board includes a same controller circuit or separate controller circuits configured to control the first sensor and the second sensor.

Example 15. The system of any of the previous examples, wherein the printed circuit board includes a same serial communications circuit or separate serial communications circuits configured to transmit data between the vehicle and the first and second sensors.

Example 16. The system of any of the previous examples, wherein the housing includes a single sealed electrical connector configured to provide power and communication channels to the first and second sensors.

Example 17. A method, comprising detecting, with a first sensor mounted to a printed circuit board retained within a housing attached to, or that forms part of, an exterior portion of a vehicle, first objects; detecting, with a second sensor mounted to the printed circuit board, second objects different from the first objects based on radio frequency (RF) signals emitted by the second objects; and detecting, with the second sensor, the second objects when the second objects are co-located with the first objects, and the first objects are undetected by the first sensor.

Example 18. The method of the previous example, wherein the first objects include one of a person and another vehicle.

Example 19. The method of the previous example, wherein the second objects include one of a mobile phone, a tablet, and a key fob.

Example 20. The method of any of the previous examples, further comprising detecting, with the second sensor, the second objects when the second objects are obscured from a field of view of the first sensor.

Example 21. The method of any of the previous examples, wherein the second sensor comprises a communication node comprising one or more of a transceiver, an antenna, and a communication network channel, and wherein the RF signals comprise one of key fob identification communications and key fob localization communications.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

What is claimed is:
1. A device comprising:
a housing attached to, or that forms part of, an exterior portion of a vehicle;
a printed circuit board retained within the housing;

a first sensor mounted to the printed circuit board and configured to detect a first object, wherein the first sensor is implemented as a radar sensor or a camera;

a second sensor mounted to the printed circuit board and configured to detect a second object different from the first object based on radio frequency (RF) signals emitted by the second object, wherein the second sensor is implemented as a RF sensor and is distinct and separate from the first sensor, and wherein the second sensor is configured to detect the second object when the second object is co-located with the first object and at least one of i) the first sensor is inactive and ii) the first object is undetected by the first sensor; and at least one control circuit configured to detect the second object via the second sensor, to determine a location of the second object based on an output of the second sensor, and, based on the location of the second object, to perform a countermeasure to prevent a collision between the vehicle and the first object, wherein the at least one control circuit is configured, while the first sensor is active and the first object is within detectable range of the first sensor and undetected by the first sensor due to the first object being blocked or obscured from a field of view of the first sensor, to detect the second object via the second sensor.

2. The device of claim 1, wherein:
the first sensor comprises a ranging sensor configured to detect a distance between the first sensor and the first object; and
the ranging sensor is a radar sensor, and wherein the housing forms a corner section of the exterior portion of the vehicle.

3. The device of claim 1, wherein the first sensor comprises a camera configured to capture images of the first object.

4. The device of claim 1, wherein the first sensor comprises a communications antenna configured to receive communications from one or more of a cellular network and a satellite network.

5. The device of claim 1, wherein the first object includes one of a person and another vehicle.

6. The device of claim 1, wherein the second object includes one of a mobile phone, a tablet, and a key fob.

7. The device of claim 1, wherein the second object detected by the second sensor is obscured from a field of view of the first sensor.

8. The device of claim 1, wherein the second sensor comprises a communication node comprising one or more of a transceiver, an antenna, and a communication network channel.

9. The device of claim 8, wherein:
the RF signals comprise one of key fob identification communications and key fob localization communications; and
the second sensor is further configured to transmit RF signals originating from one of a remote keyless entry (RKE) system, a passive entry passive start (PEPS) system, and a Digital Key system.

10. The device of claim 8, wherein:
the RF signals comprise one of key fob identification communications and key fob localization communications; and
the second sensor is configured to transmit the RF signals in accordance with one of a BLUETOOTH® Core Specification version 4.2 and later, and an Ultra-wideband (UWB) technology.

11. The device of claim 1, wherein the housing includes a same single power regulation device configured to regulate power to the first sensor and the second sensor.

12. The device of claim 1, wherein the printed circuit board includes a same single controller circuit configured to control the first sensor and the second sensor.

13. The device of claim 1, wherein the printed circuit board includes a same single serial communications circuit configured to transmit data between i) the vehicle and ii) the first sensor and the second sensor.

14. The device of claim 1, wherein the housing includes a single sealed electrical connector configured to provide power and communication channels to the first and second sensors.

15. The device of claim 1, wherein the second sensor is configured to detect the second object when the first sensor is inactive and the first object is undetected by the first sensor.

16. The device of claim 1, wherein the housing includes separate power regulation devices configured to regulate power respectively to the first sensor and the second sensor.

17. The device of claim 1, wherein the printed circuit board includes separate controller circuits configured to respectively control the first sensor and the second sensor.

18. The device of claim 1, wherein the printed circuit board comprises:
a first serial communications circuit configured to transmit data between the vehicle and the first sensor; and
a second serial communications circuit configured to transmit data between the vehicle and the second sensor.

19. The device of claim 1, wherein the RF signals are in a frequency band of a global navigation satellite system.

20. The device of claim 1, wherein the RF signals are at frequencies greater than or equal to 3 Hertz and less than 1 megahertz.

21. The device of claim 1, wherein the second sensor is programmed to transmit a wake up signal to the second object, receive the RF signals in response to the wake up signal, and transmit a broadcast message indicating received signal strength indicator values respectively of the RF signals.

22. The device of claim 1, wherein the second sensor is configured to detect a mobile phone when the first sensor is unable to detect the mobile phone, while the mobile phone is performing a phone as a key operation to access the vehicle.

23. The device of claim 1, wherein the second sensor is a different type of sensor than the first sensor and operates differently than the first sensor.

24. The device of claim 1, wherein:
the first sensor comprises at least one of a ranging sensor, a camera, a radar sensor, or a communication antenna;
the first object is a person or another vehicle;
the second sensor comprises at least one of a transceiver and an antenna; and
the second object is a mobile phone, a tablet, or a key fob.

25. The device of claim 1, wherein:
the second sensor is further configured to transmit RF signals originating from one of a remote keyless entry (RKE) system, a passive entry passive start (PEPS) system, and a Digital Key system;
the housing includes a same single power regulation device configured to regulate power to the first sensor and the second sensor; and the printed circuit board includes a same single controller circuit configured to control the first sensor and the second sensor.

26. The device of claim 25, wherein the first sensor comprises at least one of a ranging sensor, a camera, a radar sensor, or a communication antenna.

27. The device of claim 1, wherein:
the second sensor is configured to transmit the RF signals in accordance with one of a BLUETOOTH® Core Specification version 4.2 and later, and an Ultra-wideband (UWB) technology;
the housing includes a same single power regulation device configured to regulate power to the first sensor and the second sensor; and
the printed circuit board includes a same single controller circuit configured to control the first sensor and the second sensor.

28. The device of claim 27, wherein the first sensor comprises at least one of a ranging sensor, a camera, a radar sensor, or a communication antenna.

29. The device of claim 1, wherein the at least one control circuit is configured, while the first sensor is inactive, to detect via the second sensor the second object.

30. The device of claim 1, wherein the at least one control circuit is configured to, while the vehicle is powered off and the first sensor is inactive, to detect via the second sensor the second object.

31. A method comprising:
detecting, with a first sensor mounted to a printed circuit board retained within a housing attached to, or that forms part of, an exterior portion of a vehicle, a first object wherein the first sensor is implemented as a radar sensor or a camera;
detecting, with a second sensor mounted to the printed circuit board, a second object different from the first object based on radio frequency (RF) signals emitted by the second object, wherein the second sensor is implemented as a RF sensor and is distinct and separate from the first sensor;
detecting, with the second sensor, the second object when the second object is co-located with the first object and at least one of i) the first sensor is inactive and ii) the first object is undetected by the first sensor;
detecting the second object via the second sensor while the first sensor is active and the first object is within detectable range of the first sensor and undetected by the first sensor due to the first object being blocked or obscured from a field of view of the first sensor;
determining a location of the second object based on an output of the second sensor; and
based on the location of the second object, performing a countermeasure to prevent a collision between the vehicle and the first object.

32. A device comprising:
a housing attached to, or that forms part of, an exterior portion of a vehicle;
a printed circuit board retained within the housing;
a first sensor mounted to the printed circuit board and configured to detect a first object, wherein the first sensor is implemented as a radar sensor or a camera;
a second sensor mounted to the printed circuit board and configured to detect a second object different from the first object based on radio frequency (RF) signals emitted by the second object,
wherein
the first sensor is implemented as a side-facing camera capturing images from a side of the vehicle,
the first object is a person that is blocked from view of the side-facing camera,
the second sensor is implemented as a RF sensor and is distinct and separate from the first sensor,
the second sensor is configured to detect the second object i) when the second object is co-located with the first object and at least one of a) the first sensor is inactive and b) the first object is undetected by the first sensor, and ii) when the first object is blocked from view of the side-facing camera, and
the second object is a mobile phone carried by the person; and
at least one control circuit configured to detect the second object via the second sensor, to determine a location of the second object based on an output of the second sensor, and, based on the location of the second object, to perform a countermeasure to prevent a collision between the vehicle and the first object.

33. The device of claim 32, wherein the at least one control circuit is configured to localize the mobile phone based on a received signal strength indicator values or time of flight values for the RF signals emitted by the mobile phone.

* * * * *